United States Patent
Hsu et al.

(10) Patent No.: US 12,461,794 B2
(45) Date of Patent: Nov. 4, 2025

(54) METHOD OF OPTIMIZING STORING EFFICIENCY OF CLOUD COMPUTING PLATFORM, SERVER, AND COMPUTER READABLE STORAGE MEDIUM APPLYING METHOD

(71) Applicant: Fulian Precision Electronics (Tianjin) Co., LTD., Tianjin (CN)

(72) Inventors: Cheng-Ta Hsu, New Taipei (TW); Jing Guo, TianJin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 688 days.

(21) Appl. No.: 17/714,430

(22) Filed: Apr. 6, 2022

(65) Prior Publication Data
US 2023/0069336 A1     Mar. 2, 2023

(30) Foreign Application Priority Data
Aug. 26, 2021   (CN) .......................... 202110988237.5

(51) Int. Cl.
*G06F 9/50*     (2006.01)
(52) U.S. Cl.
CPC .................................. *G06F 9/5077* (2013.01)
(58) Field of Classification Search
CPC .............. G06F 9/5077; G06F 2201/81; G06F 11/3006; G06F 11/301; G06F 2201/815; G06F 11/3409; G06F 11/3442; G06F 11/3485; G06F 11/3452
See application file for complete search history.

(56) References Cited

U.S. PATENT DOCUMENTS

| | | | |
|---|---|---|---|
| 9,292,336 B1 * | 3/2016 | Ramalingam | G06Q 10/04 |
| 2013/0227111 A1 | 8/2013 | Wright et al. | |
| 2016/0349992 A1 * | 12/2016 | Basak | G06F 3/0647 |
| 2017/0251076 A1 * | 8/2017 | Bellur | H04L 67/61 |
| 2021/0326217 A1 * | 10/2021 | Martin | G06F 3/067 |
| 2021/0383010 A1 * | 12/2021 | Massiglia | G06F 11/2092 |

* cited by examiner

*Primary Examiner* — Jorge A Chu Joy-Davila
(74) *Attorney, Agent, or Firm* — ScienBiziP, P.C.

(57) ABSTRACT

A method of optimizing the scheduling of storage resource for a server used in cloud computing obtains a first input/output operations per seconds (IOPS) value of a virtual disk in an instance. A warning message is generated when the first IOPS value is larger than a predefined threshold value, which represents an overloaded state of the virtual disk. An predicted IOPS value is obtained and the predicted IOPS value is set as the maximum IOPS value for limiting the IOPS value of the virtual disk, thus other virtual disks are not affected by a virtual disk being overloaded, and storing efficiency of the server is improved. A server and a computer readable storage medium applying the method are also disclosed.

14 Claims, 3 Drawing Sheets

METHOD OF OPTIMIZING STORING EFFICIENCY OF CLOUD COMPUTING PLATFORM, SERVER, AND COMPUTER READABLE STORAGE MEDIUM APPLYING METHOD

FIELD

The subject matter herein generally relates to cloud computing platforms.

BACKGROUND

A memory resource pool in a cloud computing platform provides an online cloud storage service. The cloud computing platform includes a plurality of instances. Each instance serves as a virtual machine. The instance includes a plurality of components, such as a processor, a memory, an operation system, a network configuration, a virtual disk, and the like. Input/output operations per seconds (IOPS) of the virtual disk reflects a memory performance of the instance. The cloud computing platform sets quotas to each instance for scheduling storage resources. For example, the cloud computing platform includes one hundred instances, and the sum quotas of the IOPS value of the memory resource pool is 10 k. The quota of the IOPS value of each instance is 100. When the virtual disk in an instance is overloaded, the performances of other instances are reduced, and an efficiency of storing in the cloud computing platform is reduced.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
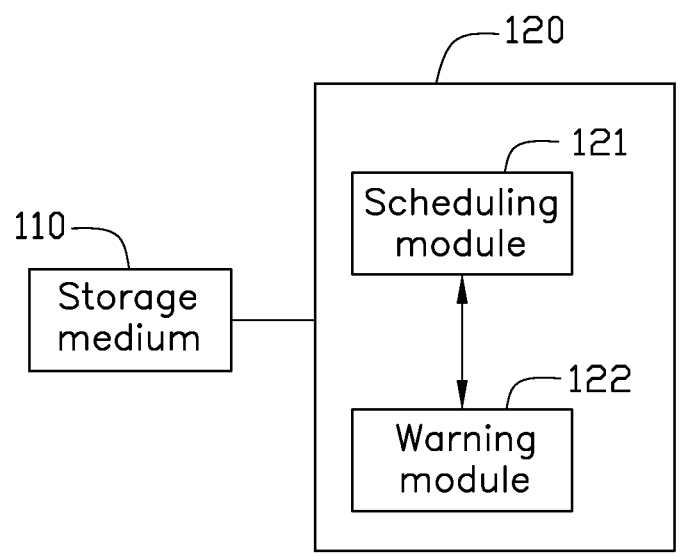
FIG. 1 is a diagram illustrating an embodiment of the hardware configuration of a server according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

FIG. 1 shows a hardware structure of a server 100.

The server 100 can include a storage medium 110 and a processor 120. The storage medium 110 and the processor 120 are connected with each other through a bus or directly connected.

The storage medium 110 can include a volatile or non-volatile memory, such as a digital versatile disc (DVD) or other type optical disk, a magnetic disk, a hard disk, and the like. In another embodiment, the storage medium 110 can be an internal memory unit in the server 100, such as a hard disk or a memory in the server 100. In other embodiments, the storage medium 110 can be an external memory device of the server 100, such as a plug-in hard disk, a SMC (Smart Memory Card), a SD (Secure Digital) card, a flash card, and the like. In one embodiment, the storage medium 110 stores computer program codes or data, such as the computer program codes of scheduling storage resource.

The processor 120 can be a central processing unit (CPU), a digital signal processor (DSP), an application specific integrated circuit (ASIC), a field-programmable gate array (FGPA), or some other programmable logic devices, discrete gate or transistor logic device, discrete hardware component, and the like. In one embodiment, the processor 120 executes the computer program codes or data stored in the storage medium 110, such as the computer program codes of scheduling storage resource.

The server 100 can include more or less components, or a different component deployment may be used.

Figure 2:
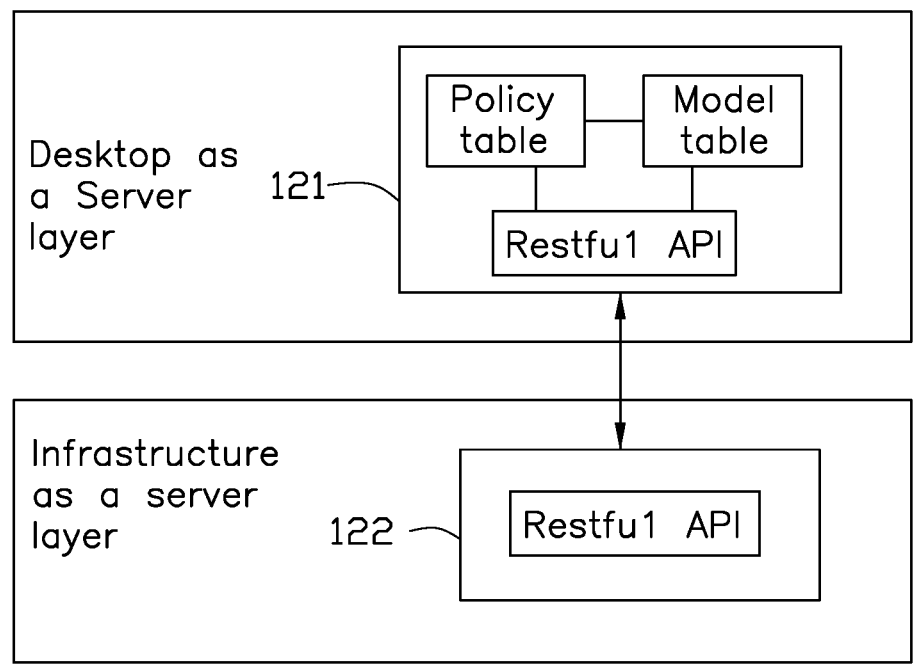
FIG. 2 is a diagram illustrating an embodiment of the software configuration of a server according to the present disclosure.

FIG. 2 shows a software configuration of the server 100. The server 100 presents layers, such as desktop as a server (DaaS) layer and infrastructure as a server (IaaS) layer.

The DssS layer provides a virtual desktop, which can be directly accessed by an authorized user through a cloud computing platform. The cloud computing platform provides a managed infrastructure, network resources, and a storage service under a cloud environment, and transmits the virtual desktop to a user device. The user can access data or applications on the virtual desktop through a Web browser or other software.

The DaaS layer can include a scheduling module 121. The scheduling module 121 collects and analyzes the IOPS value of a virtual disk in an instance for matching a model. The scheduling module 121 further sets a maximum IOPS value of the virtual disk in the instance. The scheduling module 121 includes a policy table and a model table.

As a particular policy, the policy table records the maximum IOPS values of a desktop pool as a limitation. The desktop pool includes a plurality of instances. Each instance includes to a plurality of virtual disks. The limitation policy selects one of the maximum IOPS values as a matched maximum IOPS value in a predefined time duration in a temporal dimension.

The model table includes one or more models. The model computes a number of online instances, collects states of the instances, and IOPS values in the predefined time duration. A predictive IOPS value can be computed under one or more time durations for optimizing the maximum IOPS value of the virtual disk.

For example, one day can be divided into 144 time durations. Each time duration is ten minutes. In each time duration, information can be recorded, such as a number of the instances, an average loss of the CPU, a storage usage, IOPS values of the virtual disk, and the like. In each time duration, the IOPS values are gathered at time intervals. The time interval is in a range from 30 seconds to 60 seconds. An average IOPS value is computed based on the gathered IOPS values in same time duration and serves in the future as the predictive IOPS value of the same time duration for forming a model. Thus, a model corresponding to the same time duration is formed and trained based on the gathered IOPS values. In some embodiments, the predictive IOPS values of the same time duration are inputted into the trained model for optimizing the model.

The IaaS layer provides an infrastructure service. The infrastructure can include a virtual machine, a virtual disk, a computer network, and other infrastructures in a machine room. The user can deploy and execute an operation system or applications installed on the virtual machine.

The IaaS layer can include a warning module 122. The warning module 122 collects the IOPS value of the virtual disk in the instance. When the virtual disk in the instance is overloaded, the warning module 122 generates a warning message to the scheduling module 121. The warning message includes an identification (ID) of the instance.

In one embodiment, each instance has a unique ID.

When receiving the warning message, the scheduling module 121 sets the predictive IOPS value obtained from the corresponding model as the maximum IOPS value of the virtual disk in the instance for limiting the virtual disk, thus other instances can work normally. When the virtual disk works normally, the scheduling module 121 can remove the limitation of the virtual disk to allow the use of full storage resources. A storing efficiency of the cloud computing platform is improved.

Figure 3:
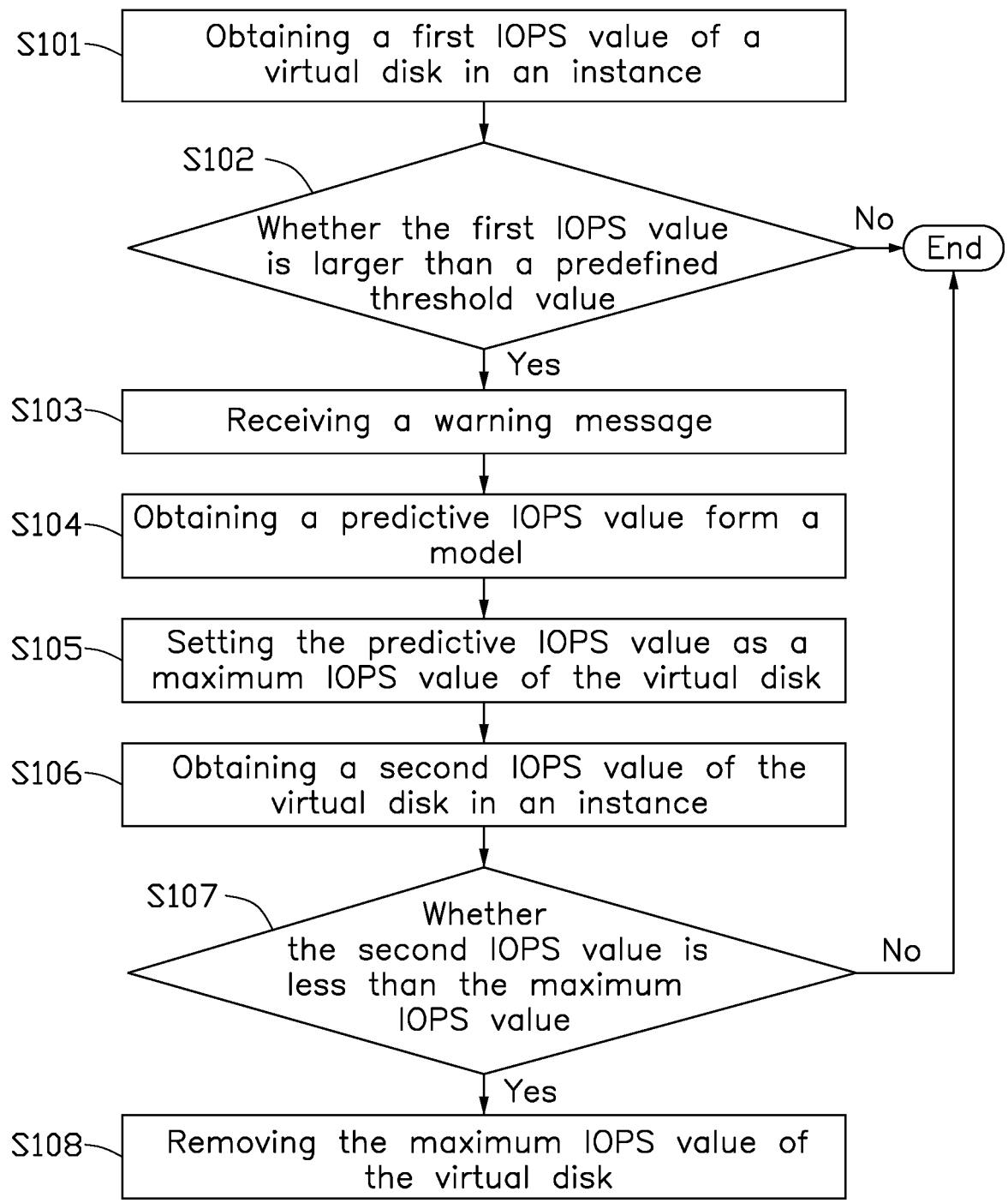
FIG. 3 is a flowchart illustrating an embodiment of a method of optimizing the scheduling of storage resource according to the present disclosure.

FIG. 3 show a flowchart of a method of optimizing storing resource schedule. The method is used in the server 100. The method includes the following steps. These steps may be re-ordered.

In block S101, a first IOPS value of a virtual disk in an instance is obtained.

In one embodiment, the warning module 122 can collects the first IOPS values of the virtual disk in the instance at predefined time interval T. In one embodiment, the time interval is in a range from 30 seconds to 60 seconds.

In block S102, determining whether the first IOPS is larger than a predefined threshold value. When the first IOPS is larger than the predefined threshold value, the procedure goes to block S103. When the first IOPS is not more than the predefined threshold value, the procedure ends.

The predefined threshold represents an overload state of the virtual disk. When the first IOPS is larger than the predefined threshold value, the virtual disk is overloaded. When the first IOPS is not more than the predefined threshold value, the virtual disk works normally.

For example, under a default state, there is no limitation of the IOPS value of the virtual disk. The IOPS value can reach a physical limiting value, such as 600. Under the default state, the IOPS value of each virtual disk in the instance reaches the physical limit value, the storage efficiency of the cloud computing platform is at a maximum value. In some embodiments, the predefined threshold can be the physical limit value. When the IOPS value of the virtual disk exceeds the predefined threshold value, the virtual disk overloads, the storing efficiency of other instances is reduced, and the overall storing efficiency of the cloud computing platform also is reduced. Thus, by limiting the IOPS value of the virtual disk against an overloaded state, the storing efficiency of the other instances can be improved, and the storing efficiency of the cloud computing platform is also improved.

In block S103, a warning message is received.

In one embodiment, when the first IOPS value is larger than the predefined threshold value, the warning module 122 sends the warning message to the scheduling module 121 through a RESTful application programming interface (API). The warning message includes an identification (ID) of the instance. The scheduling module 121 receives the warning message through the restful API.

In block S104, a predictive IOPS value is obtained from a model.

In one embodiment, the scheduling module 121 includes a model table. The model table includes one or more models. The model records IOPS values in the predefined time duration for computing an average IOPS value in the predefined time duration. The average IOPS value serves as a predictive IOPS value in the predefined time duration.

The more the number of IOPS values which are recorded by the model, the more trained samples are provided to the model. A reliability of the predictive IOPS value outputted by the model is improved.

In block S105, the predictive IOPS value is set as the maximum IOPS value of the virtual disk in the instance.

In one embodiment, the scheduling module 121 sets the maximum IOPS value of the virtual disk and sends the maximum IOPS value to the warning module 122 for updating the instance.

The maximum IOPS value is less than the physical limit value. The predictive IOPS value can be adjusted based on the model. By setting the maximum IOPS value, a limitation is provided to the virtual disk, and a conventional storing requirement is ensured.

In block S106, a second IOPS value is obtained.

In one embodiment, when the maximum IOPS value of the virtual disk is limited, the warning module 122 also collects the second IOPS value of the virtual disk in the instance.

In block S107, determining whether the second IOPS value is less than the maximum IOPS value. When the second IOPS value is less than the maximum IOPS value, the procedure goes to block S108. When the second IOPS value is equal to the maximum IOPS value, the procedure ends.

In one embodiment, when the second IOPS value is less than the maximum IOPS value detected by the warning module 122, the virtual disk works normally. When the second IOPS value is equal to the maximum IOPS value, the virtual disk is still in an overloaded state.

In block S108, the maximum IOPS value of the virtual disk in the instance is removed.

In one embodiment, when the virtual disk works normally, the warning module 122 can send a command to the scheduling module 121 to remove the maximum IOPS value. The scheduling module 121 removes the maximum IOPS value when receiving such command. A storing resource is fully released, and an efficiency of the cloud computing platform is improved.

The present disclosure also provides a computer readable storage medium. The computer readable storage medium stores computer programs or codes. The computer programs or codes can be executed by the processor 120 for implementing the method of optimizing scheduling of storage resource in the present disclosure.

The computer readable storage medium can include a computer storage medium (or a non-transitory medium) and a communication medium (or a transitory medium). As is known to those skilled in the art, the computer storage medium includes a volatile, non-volatile, removable or non-removable medium implemented in any method or technology used to store information (such as computer readable instructions, data structures, program modules or other data). The computer readable storage medium can include, but is not limited to, random access memory (RAM), read-only memory (ROM), electrically erasable programmable read-only memory (EEPROM), flash memory or other memory techniques, compact disc read-only memory (CD-ROM), DVD or other optical discs, magnetic cassette, magnetic tape, magnetic disk or other magnetic storage devices, or any other media which can be used to store the desired information and can be accessed by a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of optimizing storing efficiency of a cloud computing platform used in a server; the server presents desktop as a server (DaaS) layer and infrastructure as a server (IaaS) layer; the DaaS layer provides a virtual desktop, which is directly accessed by an authorized user through the cloud computing platform; the server comprises a storage medium with computer programs and a processor; the processor executes computer programs in the storage medium to implement the following steps:
obtaining a first input/output operations per second (IOPS) value of a virtual disk while a user accesses the virtual desktop, being one of a plurality of virtual disks comprised in an instance, by the processor;
determining whether the first IOPS value is larger than a predefined threshold value in the IaaS layer, by the processor;
obtaining a warning message, which is generated in the IaaS layer, at the DaaS layer using a Restful Application Programming Interface (API) in response to that the first IOPS value is determined to be larger than the predefined threshold value;
training models in the DaaS layer of the server, each of which corresponds to different predefined time durations in one day, by the processor;
matching one of the models based on one of the predefined time durations in the DaaS layer of the server, by the processor;
obtaining a predictive IOPS value based on an output of a matched model of one of the models, by the processor; and
setting the predictive IOPS value as a maximum IOPS value of the virtual disk, by the processor;
wherein the step of training the models, each of which corresponds to the different predefined time durations in one day, by the processor comprises:
recording IOPS values of the virtual disk at time intervals in a same predefined time duration in the storage medium, by the processor;
and
setting an average IOPS value as the predictive IOPS value, by the processor.

2. The method of claim 1, wherein the predefined threshold value comprises a physical limit value of the virtual disk.

3. The method of claim 1, wherein the predefined time interval is in a range from 30 seconds to 60 seconds.

4. The method of claim 1, wherein the method further comprises:
obtaining a second IOPS value of the virtual disk in an instance;
determining whether the second IOPS value is less than the maximum IOPS value; and
removing the maximum IOPS value of the virtual disk.

5. The method of claim 1, wherein the warning message comprises an identification of instance.

6. A server comprises:
a storage medium with computer programs; and
a processor;
the processor executes computer programs in the storage medium to implement the following steps:
obtaining a first input/output operations per second (IOPS) value of a virtual disk while a user accesses the virtual desktop, being one of a plurality of virtual disks comprised in an instance, by the processor;
determining whether the first IOPS value is larger than a predefined threshold value in an Infrastructure as a Server (IaaS) layer of a server, by the processor;
obtaining a warning message, which is generated in the IaaS layer, at a desktop as a server (DaaS) layer of the server using a Restful Application Programming Interface (API) in response to that the first IOPS value is determined to be larger than the predefined threshold value;
training models, each of which corresponds to different predefined time durations in one day, by the processor;
matching one of the models based on one of the predefined time durations, by the processor;
obtaining a predictive IOPS value based on an output of a matched model of one of the models, by the processor; and
setting the predictive IOPS value as a maximum IOPS value of the virtual disk, by the processor;
wherein the step of training the models corresponding to the different predefined time durations, by the processor comprises:
recording IOPS values of the virtual disk at time intervals in a same predefined time duration in the storage medium, by the processor;
and setting an average IOPS value as the predictive IOPS value, by the processor.

7. The server of claim 6, wherein the predefined threshold value comprises a physical limit value of the virtual disk.

8. The server of claim 6, wherein the predefined time interval is in a range from 30 seconds to 60 seconds.

9. The server of claim 6, wherein the processor further:
obtaining a second IOPS value of the virtual disk in an instance;
determining whether the second IOPS value is less than the maximum IOPS value; and
removing the maximum IOPS value of the virtual disk.

10. The server of claim 6, wherein the warning message comprises an identification of instance.

11. A non-transitory computer readable storage medium stores computer programs; the computer programs are executed by at least one processor to implement the following steps:
obtaining a first input/output operations per second (IOPS) value of a virtual disk while a user accesses the virtual desktop, being one of a plurality of virtual disks comprised in an instance, by the processor;
determining whether the first IOPS value is larger than a predefined threshold value in an Infrastructure as a Server (IaaS) layer of a server, by the processor;
obtaining a warning message, which is generated in the IaaS layer, at a desktop as a server (DaaS) layer of the server using a Restful Application Programming Interface (API) in response to that the first IOPS value is determined to be larger than the predefined threshold value;
training models, each of which corresponds to different predefined time durations in one day, by the processor;
matching one of the models based on a predefined time duration, by the processor;
obtaining a predictive IOPS value based on an output of a matched model of one of the models, by the processor; and
setting the predictive IOPS value as a maximum IOPS value of the virtual disk, by the processors wherein the step of training the models corresponding to the different predefined time durations, by the processor comprises:
recording IOPS values of the virtual disk at time intervals in a same predefined time duration in the storage medium, by the processor;
and setting an average IOPS value as the predictive IOPS value, by the processor.

12. The non-transitory computer readable storage medium of claim 11, wherein the predefined threshold value comprises a physical limit value of the virtual disk.

13. The non-transitory computer readable storage medium of claim 11, wherein the predefined time interval is in a range from 30 seconds to 60 seconds.

14. The non-transitory computer readable storage medium of claim 11, wherein the method further comprises:
obtaining a second IOPS value of the virtual disk in an instance;
determining whether the second IOPS value is less than the maximum IOPS value; and
removing the maximum IOPS value of the virtual disk.

\* \* \* \* \*